(12) United States Patent
Tao et al.

(10) Patent No.: US 8,578,047 B2
(45) Date of Patent: Nov. 5, 2013

(54) METHODS AND SYSTEMS FOR RESOURCE ALLOCATION

(75) Inventors: Ming Hung Tao, Tainan (TW); Mamadou Kone, Jhudong Township (TW)

(73) Assignee: Industrial Technology Research Institute, Hsinchu (TW)

( * ) Notice: Subject to any disclaimer, the term of this patent is extended or adjusted under 35 U.S.C. 154(b) by 1100 days.

(21) Appl. No.: 12/260,202

(22) Filed: Oct. 29, 2008

(65) Prior Publication Data

US 2009/0228891 A1    Sep. 10, 2009

Related U.S. Application Data

(60) Provisional application No. 61/034,709, filed on Mar. 7, 2008.

(51) Int. Cl.
*H04J 1/00*    (2006.01)
(52) U.S. Cl.
USPC .......................................... 709/236; 370/343
(58) Field of Classification Search
USPC ........................................................ 709/236
See application file for complete search history.

(56) References Cited

U.S. PATENT DOCUMENTS

2006/0153112 A1*   7/2006   Lim et al. ...................... 370/310

OTHER PUBLICATIONS 802.16m Requirements Editor: Mark Cudak. "IEEE 802.16m Systems Requirements", IEEE 802.16m-07/002r4, Oct. 19, 2007.
S. Ahmadi et al., "Proposed 802.16m Frame Structure Baseline Content Suitable for Use in the 802.16m SDD", IEEE C802.16m-08/118, Feb. 27, 2008.

* cited by examiner

*Primary Examiner* — Patrice Winder
(74) *Attorney, Agent, or Firm* — Finnegan, Henderson, Farabow, Garrett & Dunner, LLP

(57) ABSTRACT

A method and apparatus for performing resource allocation in a communication system is provided. The method includes receiving a data frame including encapsulated data and a transmission opportunity, the data frame being divided into sub-frames which include primary resource blocks that are divided into secondary resource blocks storing the encapsulated data or the transmission opportunity, deconstructing the data frame to retrieve a portion of the encapsulated data or the transmission opportunity by determining a location of one of the sub-frames and one of the secondary resource block that included the portion of the encapsulated data or the transmission opportunity, wherein the location of the one secondary resource block is determined based on the inner boundaries.

25 Claims, 6 Drawing Sheets

METHODS AND SYSTEMS FOR RESOURCE ALLOCATION

RELATED APPLICATIONS

This application claims priority from U.S. Provisional Patent Application No. 61/034,709 filed Mar. 7, 2008, the contents of which are hereby incorporated by reference in their entirety.

BACKGROUND

1. Technical Field

Systems and methods disclosed herein relate to the field of telecommunication and, more specifically, to systems and methods that resource allocation.

2. Description of the Related Art

Communication networks facilitate the exchange of data between or among various electronic devices, such as mobile stations (MSs), base stations (BSs), access points, cellular phones, personal digital assistants, radios, personal computers, notebooks, workstations, global positioning devices, servers, and other devices that may be used to transmit and/or receive data. The increased use of electronic devices has resulted in an increased demand for high-speed, reliable, and secure transmission of data, via communication networks.

To transmit data accurately and with high speeds a conventional base station encapsulates data to generate data frames, and subsequently transmits the generated data frames. As is illustrated in FIG. 1, a data frame 102 may be referred to as a super-frame and may be of a fixed length, for example, 20 ms. The information included in super-frame 102 is defined by using bits of data.

Super-frame 102 may include a predetermined number of sub-frames 104a-n. Each sub-frame may include of a plurality of resource blocks 106a-n and control blocks 108a-n. There may be one control block for every n contiguous sub-frames, which may include information used by mobile stations or other nodes in a network to access resource blocks within the n sub-frames. For example, control block 108a may include information describing resource blocks 106a in sub-frame 104a and subsequent sub-frames.

Resource blocks 106a may be arranged in a manner disclosed in FIG. 1. For example, there may be five resource blocks 110, 112, 114, 116, and 118, within resource block 106a, and control block 108a may include information describing the properties, the location, and/or the sizes of resource blocks 110, 112, 114, 116, and 118. For example, control block 108a may include information describing resource block 110 by providing information with respect to starting point 120, length 122, and width 124. Similarly, control block 108a may including information regarding starting point 126, length 128, and width 130 to describe resource block 112. The description information in the control blocks may be read out by mobile stations to access the resource blocks. The time and resources required to process this information may affect transmission speeds and may increase overhead caused due to transmission of excess and redundant data during communication.

In conventional data frames, the mobile station has to decode every control block to access the resource blocks belonging to the mobile station. When control blocks appear in high frequency, for example in every downlink sub-frame, the mobile station must function continuously to receive control blocks and decode each control block to determine the location of resource blocks belonging to the mobile station. The decoding of each control block requires excess processing and is not be power-efficient. Furthermore, control blocks in conventional data frames describe resource blocks in four parameters, x-axis starting point, y-axis starting point, block length, and block width, which may require unnecessary data bits and may not be space-efficient. Therefore, it would be desirable to provide methods and apparatus directed to the shortcomings noted above.

SUMMARY

Consistent with embodiments of the invention, a method of performing resource allocation in a communication system is provided. The method comprises receiving a data frame including encapsulated data and a transmission opportunity, the data frame being divided into sub-frames which include primary resource blocks that are divided into secondary resource blocks storing the encapsulated data or the transmission opportunity; deconstructing the data frame to retrieve a portion of the encapsulated data or the transmission opportunity, the portion included in one of the secondary resource blocks having outer and inner boundaries; determining from a first information profile a location of one of the sub-frames that includes the one secondary resource block; determining from a second information profile, in a hierarchical relationship with the first information profile, a location of the one secondary resource block, wherein the location of the one secondary resource block is determined based on the inner boundaries; retrieving the portion of the encapsulated data or the transmission opportunity; and processing the retrieved data or the transmission opportunity.

Also consistent with embodiments of the present invention, there is provided an apparatus for receiving data in a communication system, comprising a receiver to receive a data frame including encapsulated data, the data frame being divided into sub-frames which include primary resource blocks that are divided into secondary resource blocks storing the encapsulated data or a transmission opportunity; and a processor to: deconstruct the data frame to retrieve a portion of the encapsulated data or transmission opportunities, the portion included in one of the secondary resource blocks having outer and inner boundaries; determine from a first information profile a location of one of the sub-frames that includes the one secondary resource block; determine from a second information profile, in a hierarchical relationship with the first information profile, a location of the one secondary resource block, wherein the location of the one secondary resource block is determined based on the inner boundaries; retrieve the portion of the encapsulated data or the transmission opportunity; and process the retrieved data or the transmission opportunity.

Further consistent with embodiments of the present invention, an apparatus for transmitting data in a communication system is provided. The apparatus comprises a memory device to store data; a processor to retrieve the stored data; encapsulate the data and the transmission opportunity to generate a data frame, the data frame being divided into sub-frames and including primary resource blocks that are divided into secondary resource blocks storing the encapsulated data or the transmission opportunity; a first information profile including location information corresponding to a portion of the encapsulated data stored in one of the secondary resource blocks having outer and inner boundaries, the location information identifying one of the sub-frames including the one secondary resource block; and a second information profile, in a hierarchical relationship with the first information profile, including location information corresponding to the one secondary resource block, wherein the location of the one secondary resource block is determined based on the inner boundaries; and a transmitter to transmit the data frame, the data frame being processed to retrieve the portion of the encapsulated data or the transmission opportunity It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate various embodiments. In the drawings.

DESCRIPTION OF THE EMBODIMENTS

In the following description, for purposes of explanation and not limitation, specific techniques and embodiments are set forth, such as particular sequences of steps, interfaces, and configurations, in order to provide a thorough understanding of the techniques presented herein. While the techniques and embodiments will primarily be described in context with the accompanying drawings, those skilled in the art will further appreciate that the techniques and embodiments can also be practiced in other communication devices.

Reference will now be made in detail to exemplary embodiments of the invention, examples of which are illustrated in the accompanying drawings. Wherever possible, the same reference numbers will be used throughout the drawings to refer to the same or like parts.

Figure 1:
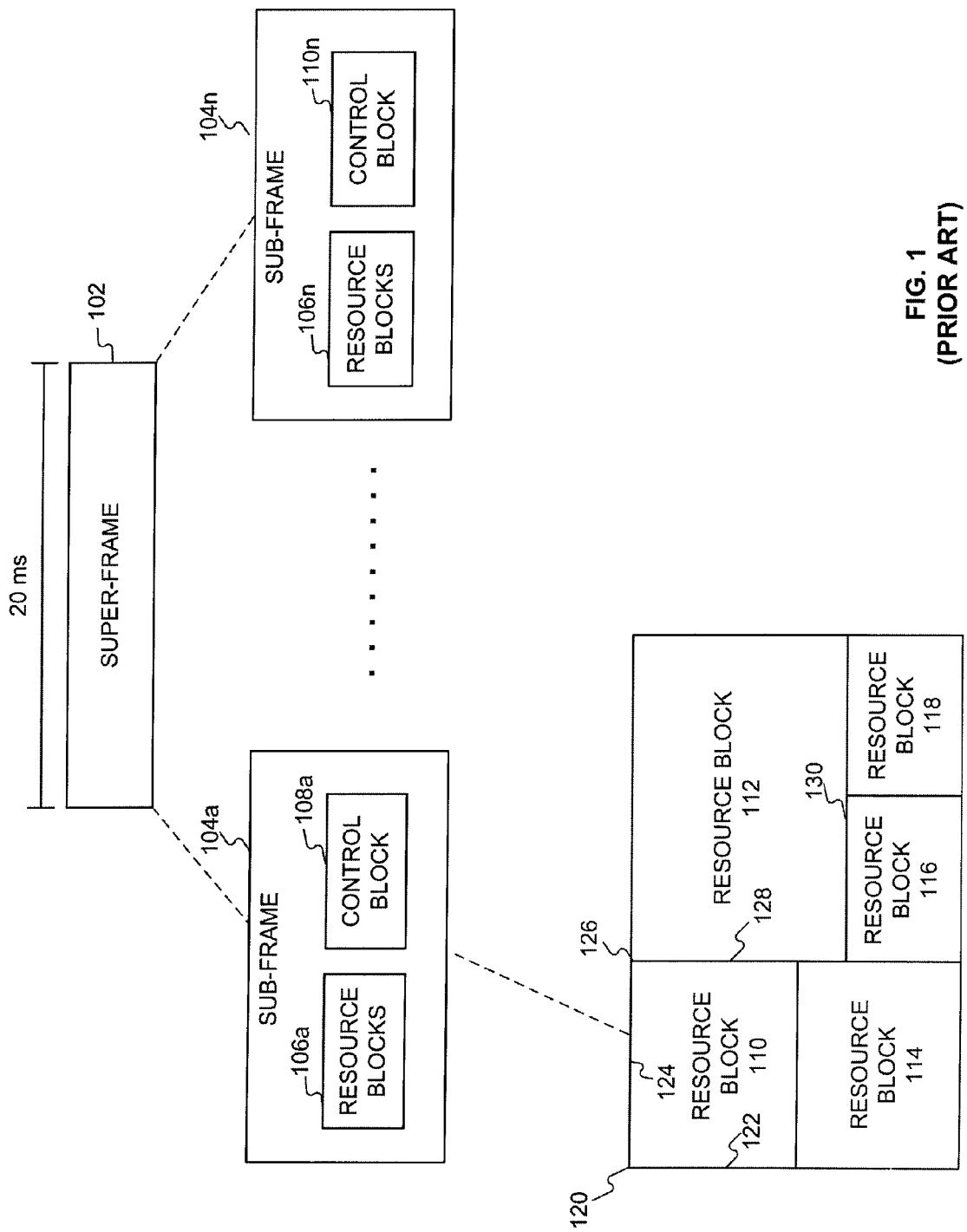
FIG. 1 is a schematic diagram of a conventional data frame.
Figure 2:
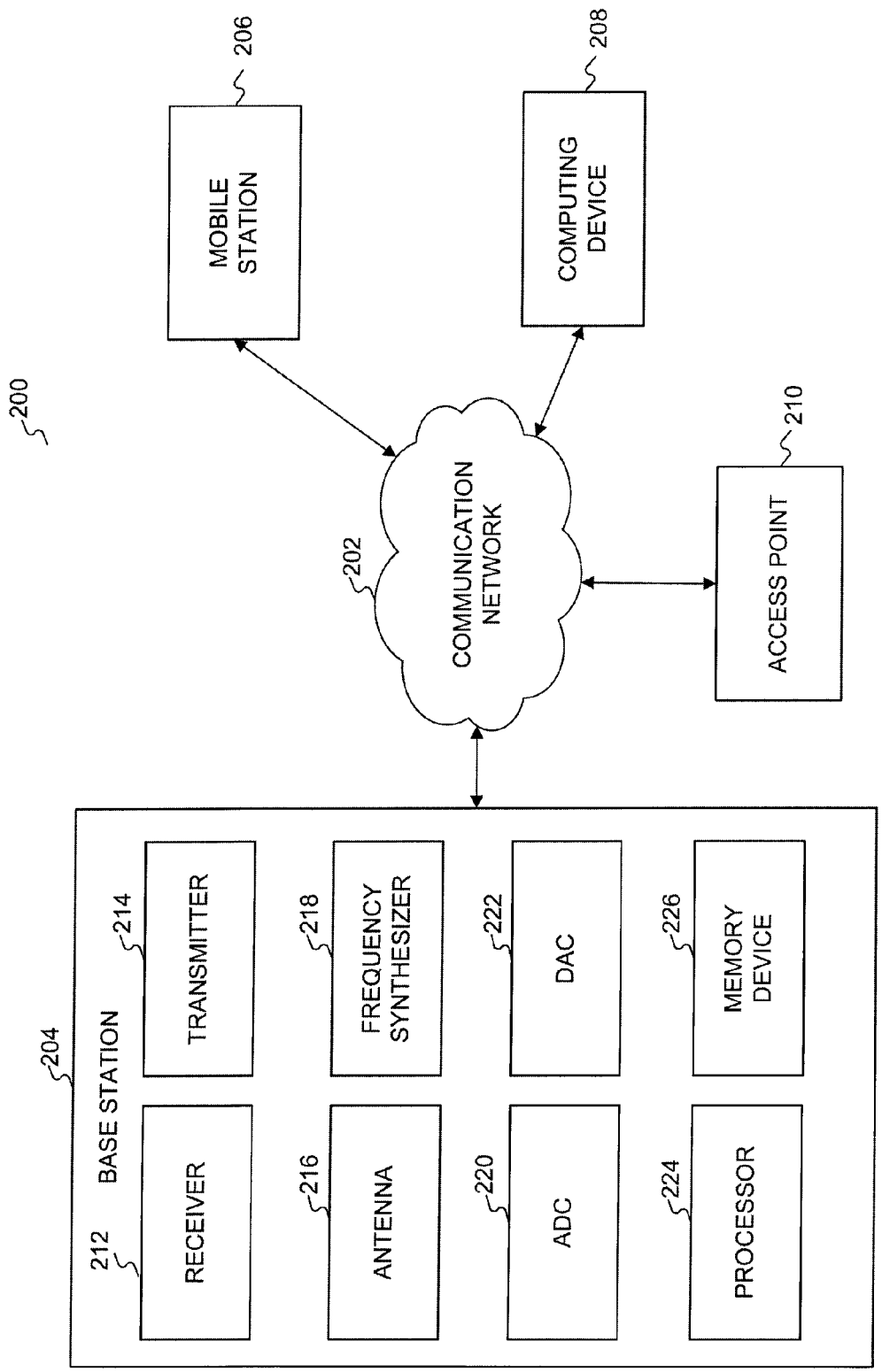
FIG. 2 is a schematic diagram illustrating an exemplary communication system, in accordance with the invention.

FIG. 2 illustrates a communication system 200 for communication between or among electronic devices. Communication system 200 facilitates communication between or among various electronic devices by way of processing, transmitting, and/or receiving data frames. Specifically, communication system 200 may include a communication network 202 that facilitates communication between two or more of a plurality of nodes 204, 206, 208, and 210. Communication network 202 includes one or more network types, such as a wide-area network (WAN), a local-area network (LAN), a 3G network, a Worldwide Interoperability for Microwave Access (WiMAX) network, a Long Term Evolution (LTE) network, Code-Division Multiple Access (CDMA) network, Wideband CDMA (WCDMA) network, or any other appropriate protocol to facilitate communication between two or more of nodes 204, 206, 208, and 210. Communication network 202 may operate by wireline and/or wireless techniques and may, but need not, operate in accordance with protocols defined in IEEE 802.11, 802.11a, 802.11b, 802.11e, 802.11g, 802.11h, 802.11i, 802.11n, 802.16, 802.16d, 802.16e, and/or 802.16m. Network connections between or among the nodes of communication system 200 may be established via Ethernet, telephone line, cellular channels, or other transmission media.

One or more nodes of communication system 200 can include of a combination of one or more application programs and/or one or more hardware components. For example, application programs may include software modules, sequences of instructions, routines, data structures, display interfaces, and/or another type of structure that executes operation of the present invention. Further, a hardware component may include a combination of Central Processing Units (CPUs), buses, memory devices, storage units, data processors, control devices, transmitters, receivers, antennas, transceivers, input devices, output devices, network interface devices, and/or another type of component that is apparent to those skilled in the art.

As shown in FIG. 2, nodes 204, 206, 208, and 210 of communication system 200 may respectively represent a base station 204, a mobile station 206, a computing device 208, and an access point 210. Nodes 202, 204, 206, 208, and 210 may send and/or receive data frames via communication network 202, and/or may perform various processing operations using the data frames. For example, a data frame may be processed by mobile station 206 to acquire system configurations of base station 204 or to read out resource allocation of downlink (DL) and uplink (UL) transmissions.

As is illustrated in FIG. 2, base station 204 may include one or more of a receiver 212 for receiving one or more data frames, a transmitter 214 for transmitting one or more data frames, and an antenna 216 for directing transmission and/or reception of data frames. Base station 204 may also include a frequency synthesizer 218 for controlling the frequency of signals transmitted by transmitter 214, an analog to digital converter (ADC) 220 for down-converting signals, a digital to analog converter (DAC) 222 for up-converting signals, a processor 224, and a memory device 226. Processor 224 may be a medium access controller (MAC) and/or a physical layer processing circuit, and/or memory device 226 may include any or all forms of non-volatile or volatile memory, including, by way of example, semiconductor memory devices, such as EPROM, RAM, ROM, DRAM, EEPROM, and flash memory devices; magnetic disks such as internal hard disks and removable disks; magneto-optical disks; and CD-ROM disks.

Base station 204 may also include additional components, and or one or more of mobile station 206, computing device 208, and access point 210 may include components similar to the ones included in base station 204.

Consistent with an embodiment of the invention, receiver of mobile station 206 may receive, via communication network 202, a data frame or portion of the data frame from the base station 204. As is described in further detail below, the portion of the data frame may include a plurality of sub-frames, Super-MAPs, and Sub-MAPs. The Super-MAPs may include the system information, sub-frame usage information, and Sub-MAPs location/indication information within a super-frame. Each super-frame may include only one Super-MAP and multiple Sub-MAPs. The Super-MAP and Sub-MAPs may have a hierarchical relationship, where a Super-MAP may be at a higher level in the hierarchy and the Sub-MAPs are at a lower level in the hierarchy. Sub-MAPs may include the resource block information for one or more sub-frames, the resource block information facilitates mobile stations transmitting or receiving data in specific zones.

Processor 224 may perform processing operations functions such as resource allocation. For example, base station 204 may need to transmit downlink data to mobile station 206 and access point 210. If the data to be transmitted to mobile station 206 is larger than the data to be transmitted to access point 210 base station 204 has to allocate a larger data block for mobile station 206 and a smaller data block for access point 210, in a sub-frame. Resource allocation in an uplink transmission (transmission opportunity) may be performed in a similar manner. A transmission opportunity may identify a region or location to which a node in communication system 200 is allowed to transmit data. For example, a transmission opportunity in an up-link sub-frame may identify a location in base station 204 to which mobile station 206 may be allowed to transmit data.

Alternatively, processor 224 may retrieve data from memory device 226 and encapsulate the data and one or more transmission opportunities to construct data frames, such as super-frames, for transmission. Processor 224 may include a plurality of sub-frames, resource blocks, Super-MAPs, Sub-MAPs and/or necessary information in the data frames, and provide the data frames to DAC 222. DAC 222 may process the data frames and may transmit the data frames to one or more of nodes 206, 208, and 210. The receiving node(s) may then deconstruct the data frames and use the data or the one or more transmission opportunities encapsulated in the data frames to perform processing tasks. During deconstruction of a data frames a receiving node first reads a received Super-MAP to determine that sub-frame which may contain particular resource blocks. Next, the receiving node reads a Sub-MAP to determine a location of a particular resource block in that sub-frame. Also, the mobile station may use the transmission opportunity to encapsulate and transmit data packets to the base station.

Although the exemplary embodiment of communication system 200 is described as having particular components arranged in a particular manner, one skilled in the art will appreciate that communication system 200 may include additional or fewer components that may be arranged differently. For example, communication system 200 may be implemented with a plurality of base stations, mobile stations, computing devices, access points, and/or additional electronic devices such as workstations, mainframe computers, notebooks, global positioning devices, and/or handheld devices.

Figure 3:
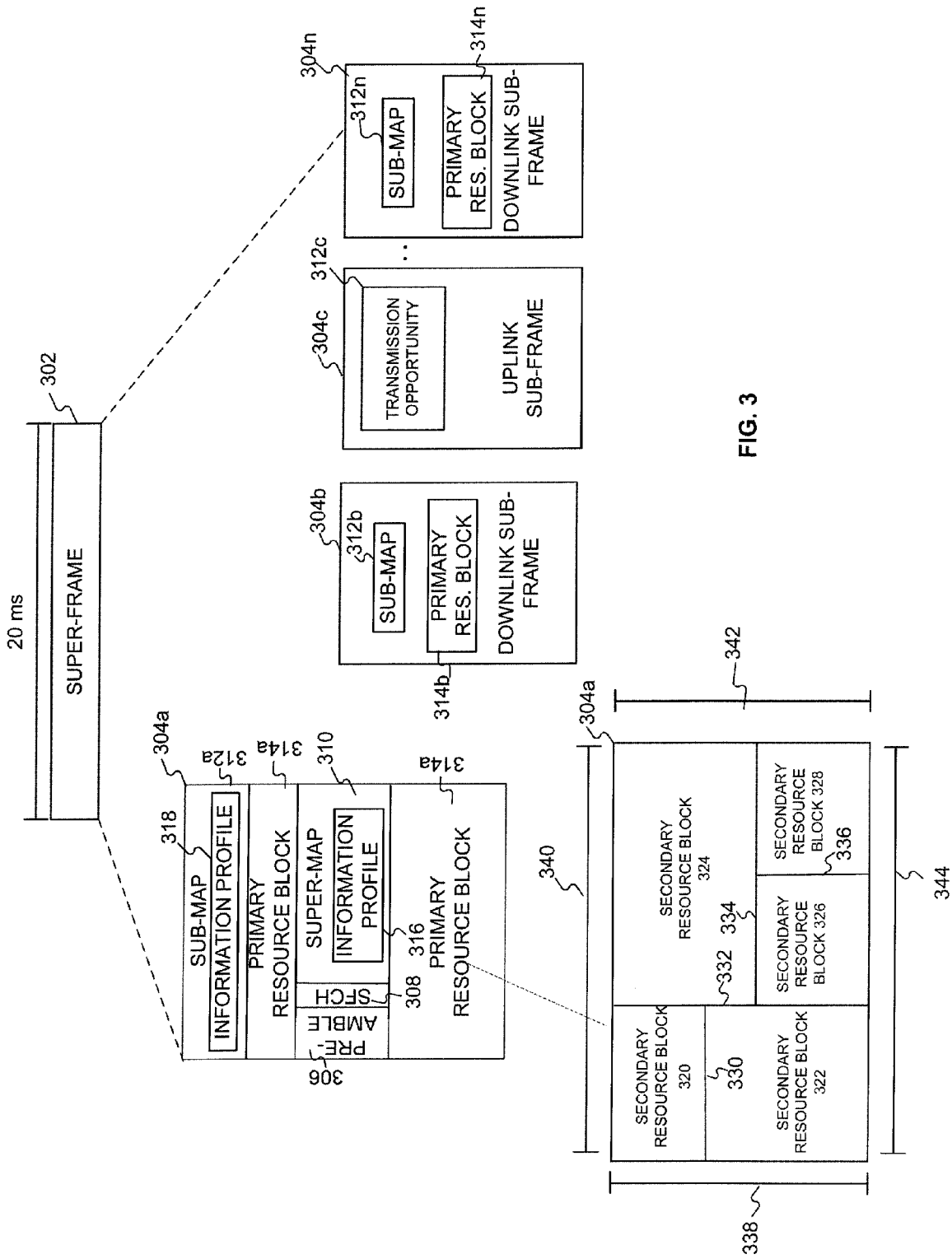
FIG. 3 is a schematic diagram of an exemplary sub-frame, in accordance with the invention.

Referring now to FIG. 3, a data frame 300 in accordance with the invention is provided. As illustrated in FIG. 3, data frame 300 may be referred to as a super-frame 302 and may be of a fixed length. Super-frame 302 be a portion of a transmitted and/or received communication and may represent a segment of a larger communication signal or stream. The transmission time interval (TTI) or length of super-frame 302 may be, for example, 20 ms. Super-frame 302 includes integer number of orthogonal frequency-division multiplexing access (OFDMA) symbols that may be used for modulation of the communication signal, and may have switching points for changing between a DL and UL transmission. Super-frame 302 may also include synchronization and/or broadcasting information used for communication between or among nodes of a communication system, such as communication system 200.

Super-frame 302 may be sub-divided into a plurality of sub-frames 304a-n, where each sub-frame may support different functions, service types, and modulation or coding schemes for particular nodes of a communication system. Sub-frame 304a of super-frame 302 may include a preamble 306, a super-frame control header (SFCH) 308, a Super-MAP 310, a Sub-MAP 312a, and a primary resource block 314a. Similarly, sub-frame 304b may include Sub-MAP 312b and a primary resource block 314b, and sub-frame 304n may include Sub-MAP 312n and a primary resource block 314n. Sub-frame 304c may be an uplink sub-frame and may include a transmission opportunity 312c that may identify a location to which data transmission may be allowed. Super-MAP 310 and Sub-MAPs 312a-n may store information in a hierarchical relationship, where Super-MAP 310 may be at a higher level in the hierarchy and Sub-MAPs 312a-n may be at a lower level in the hierarchy. Sub-MAPs 312a-n may include information describing resource blocks in corresponding sub-frames 304a-n.

Preamble 306 may be included to provide a control signal that may be used by mobile stations to synchronize their time with that of base station, and SFCH 308 may be included to provide information that may be required to decode Super-MAP. This information may include, for example, the type of modulation and coding scheme that a Super-MAP uses and/or the length of a Super-MAP.

Super-MAP 310 may include an information profile 316 that includes broadcast system information, configuration information of sub-frames 304a-n, and location information of Sub-MAPs 312a-n. Sub-MAPs 312a-n may be included in downlink sub-frames and not in uplink sub-frames. Information stored in information profile 316 describes functions, service types, and modulation or coding schemes of sub-frames 304a-n. For example, sub-frame 304b may be a DL sub-frame, and sub-frame 304c may be an UL sub-frame. To describe the differing functions of sub-frames 304a-n, Super-MAP 310 may assign unique sub-frame usage codes (SUCs) to sub-frames 304a-n and may include the assigned SUCs in information profile 316. Furthermore, information profile 316 may include location information and the modulation scheme of Sub-MAPs 312a-n.

Sub-MAPs 312a-n may include information profiles for describing resource allocation information of one or more sub-frames 304a-n and location information of resource blocks and/or one or more transmission opportunities encapsulated within sub-frames 304a-n. For example, information profile 318 may describe resource allocation information of sub-frame 304a and may also include information describing the location of secondary resource blocks 320, 322, 324, 326, 328 within sub-frame 304a. Super-MAP, together with SFCH and preamble, may be regarded as one secondary resource block that needs to be decoded by mobile stations during transmission of super-frame 302.

As is illustrated in FIG. 3, primary resource block 314 may be divided into secondary resource blocks 320, 322, 324, 326, and 328. A conventional control block describes the location of each secondary resource block by a starting point of the block, by a length of a block, and by a width of a block. To reduce the describing overhead information profile 318 describes only the inner-boundary information with respect to the secondary resource blocks. By retrieving the location, direction, and length of inner-boundaries, mobile stations will determine the position and size of all secondary resource blocks. For example, information profile 318 may describe resource blocks 320, 322, 324, 326, and 328 by including information with respect to inner-boundaries 330, 332, 334, and 336. This information along with information with respect to the system bandwidth, the quantity of sub-frames, and the super-frame length may then be used to derive information with respect to the outer boundaries 338, 340, 342, and 344 of resource blocks included in sub-frame 304a.

Figure 4:
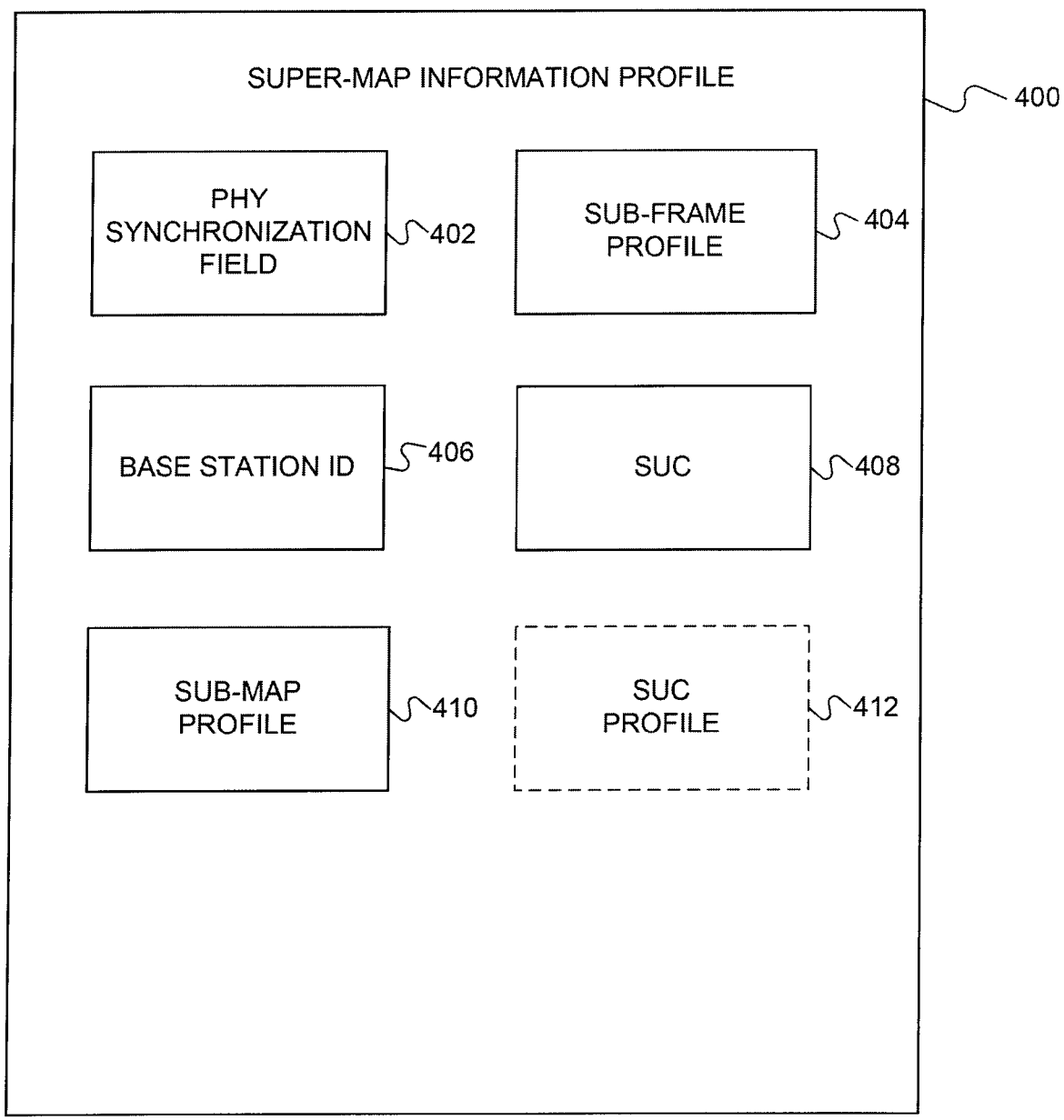
FIG. 4 is a schematic diagram illustrating an exemplary configuration of a Super-MAP information profile, in accordance with the invention.

Referring now to FIG. 4, an exemplary configuration of a Super-MAP information profile is provided. Super-MAP information profile 400 may correspond to information profile 316 of sub-frame 304a and may include information describing a super-frame. For example, Super-MAP information profile 400 may include a physical (PHY) synchronization field 402, a sub-frame profile 404 describing the number of sub-frames in a super-frame and the sub-frame length, a base station ID 406, a sub-frame usage code (SUC) 408 for each sub-frame, and a Sub-MAP profile 410 indicating the location and modulation schemes of Sub-MAPs.

PHY synchronization field 402 may provide synchronization information that may be used for mobile stations to synchronize their time with base station. Sub-frame profile 404 may identify the number of sub-frames and the length of the sub-frames included in the super-frame, where the length of the sub-frames may be defined by using OFDMA symbols. Base station ID 406 may provide identification information corresponding to the originator of the super-frame that is being described by Super-MAP information profile 400. SUC 408 may indicate the functions, service types, and/or modulation or coding schemes supported by sub-frames. For example, a sub-frame with an SUC of one may be a downlink sub-frame, a sub-frame with an SUC of two may be an uplink sub-frame, a sub-frame with an SUC of three may be a broadcast/multicast service sub-frame, and a sub-frame with an SUC of four may be an emergent service sub-frame.

Sub-MAP profile 410 may identify the number of Sub-MAPs in the super-frame and may provide location and management information of the Sub-MAPs. For example, management and location information may include the forward error correction (FEC) code of the Sub-MAPs, modulation types of the Sub-MAPs, repetition codes used in the Sub-MAPs, the number of sub-frames controlled by particular Sub-MAPs, the sub-frame that a particular Sub-MAP is located in, the lengths of Sub-MAPs, the sequence number in which particular Sub-MAPs control a sub-frame, and/or any other information that may be used to define properties or configuration information of the super-frame that includes Super-MAP information profile 400.

In an alternative configuration, Super-MAP information profile may replace sub-frame profile 404 and SUC 408 with an SUC profile 412. For example, fields describing the number of sub-frames and the lengths of sub-frames may be replaced with pre-defined values that may contain different sub-frame configurations and SUC values. These predefined values may be generated by, for example, telecommunication operators and SUC profile value of one may be used to represent a super-frame consisting of four sub-frames, where each sub-frame may have a length of 5 ms. By using SUC profile 412, the information size of Super-MAP information profile can be significantly reduced, which results in less control overhead.

Figure 5:
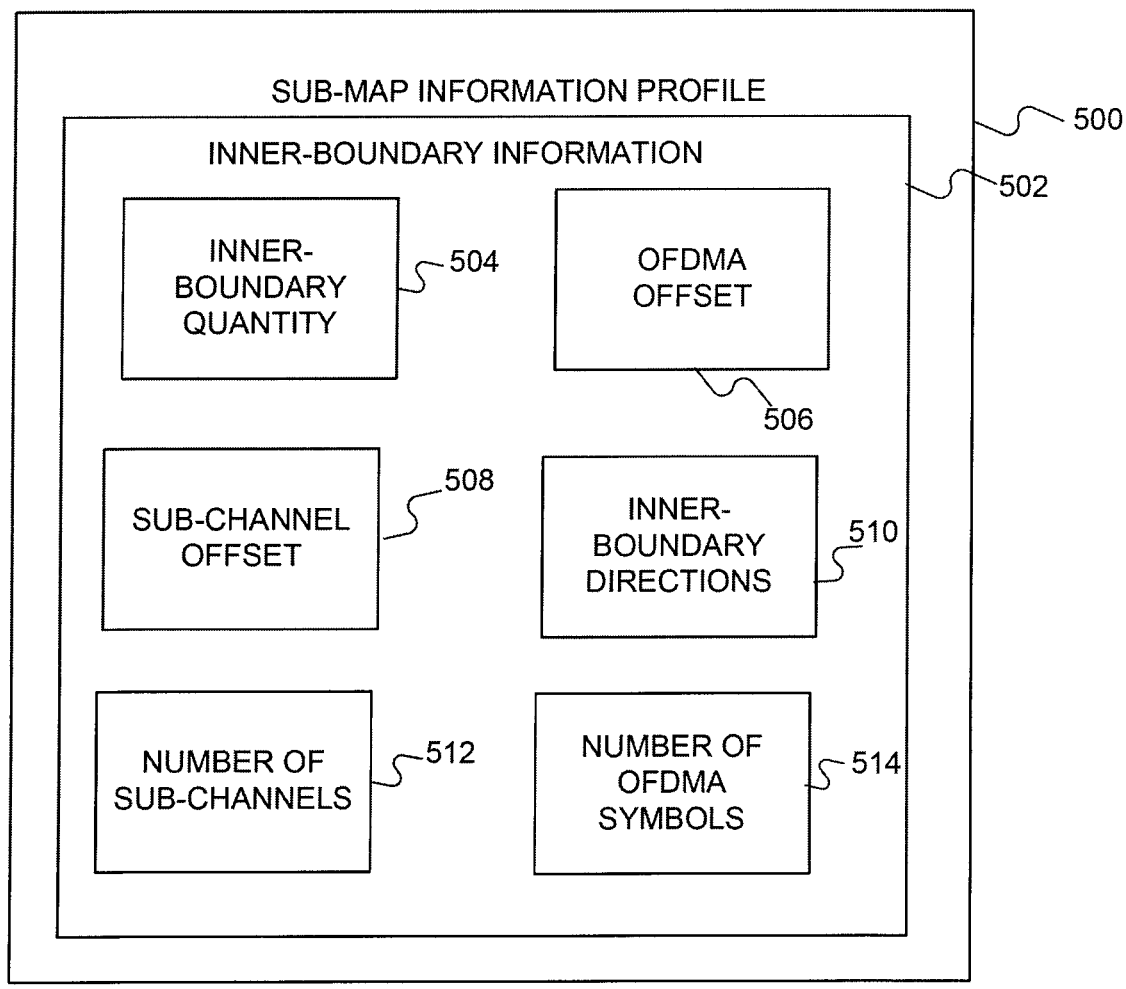
FIG. 5 is a schematic diagram illustrating an exemplary configuration of a Sub-MAP information profile, in accordance with the invention.

FIG. 5 illustrates an exemplary configuration of a Sub-MAP information profile 500 that may correspond to information profile 318 of sub-frame 304a and may include information describing secondary resource blocks 320, 322, 324, 326, and 328. For example, Sub-MAP information profile 500 may include inner-boundary information 502 for each sub-frame this Sub-MAP is controlling. Inner-boundary information may include inner-boundary quantity 504, OFDMA offset 506, sub-channel offset 508, inner-boundary directions 510, number of sub-channels 512, and number of OFDMA symbols 514.

Inner-boundary quantity 504 may identify the number of inner-boundaries included in a particular sub-frame and OFDMA offset 506 and sub-channel offset 508 may identify the start points of the inner boundaries identified in inner-boundary quantity 504. Inner-boundary directions 510 may describe the directions of the inner boundaries identified in inner-boundary quantity 504. For example, inner-boundary directions 510 may describe that a particular inner-boundary is in a horizontal or vertical direction. Number of sub-channels 512 may identify lengths of inner-boundaries that are described as being vertical by inner-boundary directions 510 and number of OFDMA symbols 514 may identify lengths of inner-boundaries that are described as being horizontal by inner-boundary directions 510.

As will be apparent to those of ordinary skill in the art Super-MAP profile 400 and Sub-MAP profile 500 may be encapsulated in a super-frame prior to transmission of the super-frame. When a particular node in a communication network receives the super-frame or multiple super-frames, the node may read out data encapsulated in the profiles to determine resource allocation of particular sub-frames. The data may be read out by using inner-boundary information included in Sub-MAP profile 500 to identify the location and properties of a particular secondary resource block in a particular sub-frame, and the data may then be used to perform processing operations.

Figure 6:
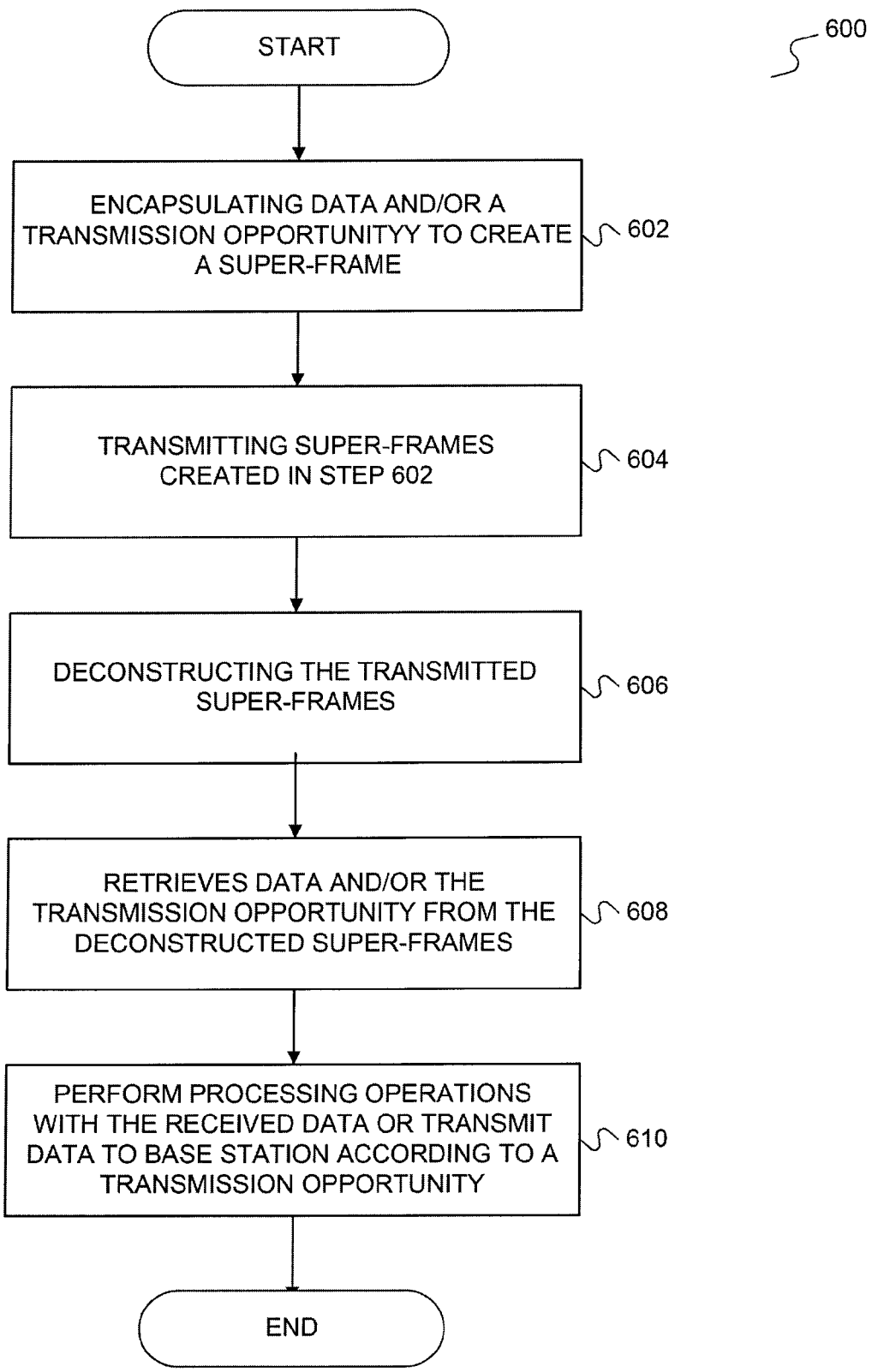
FIG. 6 illustrates a flow diagram of an exemplary method for overall operations, in accordance with the invention.

FIG. 6 is a flow chart of an exemplary method 600 for performing overall operations. Method 600 may be implemented using communication system 200 or other systems known to those of ordinary skill in the art. The process begins in step 602 where data (downlink) and a transmission opportunity (uplink) is encapsulated to create a super-frame. Step 602 may be performed by, for example, base station 204 of communication system 200, where a super-frame may be created by encapsulating one Super-MAP and multiple Sub-MAPs in the super-frame. Super-frame may include data such as, synchronization data, broadcast information, configuration information, sub-channel information, orthogonal frequency division multiplexing (OFDMA) symbols, and/or other data used for performing various processing operations.

Next, in step 604, one or multiple super-frames encapsulated in step 602 may be transmitted to another node of a communication system. For example, the super-frame may be transmitted to mobile station 206 of communication system 200. Next, the transmitted super-frame may be de-constructed by a node receiving the data or the transmission opportunity (step 606). For example, mobile station 206 may receive the transmitted super-frame and may de-construct the super-frame to receive or transmit data.

Next, the portion de-constructed in step 606 may be used to retrieve data or a transmission opportunity encapsulated in the portion (step 608). For example, mobile station 206 may retrieve data or a transmission opportunity by using one Super-MAP and multiple Sub-MAPs encapsulated in the portion to identify properties and locations of secondary resource blocks also encapsulated in the portion. Mobile station 206 may use Sub-MAPs to identify inner-boundaries of the encapsulated secondary resource blocks to read or transmit data. Next, in step 610, the data retrieved and read in step 608 may be used to perform various processing operations. For example, mobile station 206 may use the retrieved data to generate a response or store the retrieved data for further processing.

Although method 600 is described to begin by generating a new super-frame in step 602, one of ordinary skill in the art will appreciate that step 602 may include creating a super-frame by using data stored in a memory device, or step 602 may occur in response to a data request received by a communication node in a communication system.

The foregoing description has been presented for purposes of illustration. It is not exhaustive and does not limit the invention to the precise forms or embodiments disclosed. Modifications and adaptations of the invention will be apparent to those of ordinary skill in the art from consideration of the specification and practice of the disclosed embodiments of the invention.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of performing resource allocation in a communication system, comprising:
    receiving a data frame including encapsulated data and a transmission opportunity, the data frame being divided into sub-frames which include primary resource blocks that are divided into secondary resource blocks storing the encapsulated data or the transmission opportunity;
    deconstructing the data frame to retrieve a portion of the encapsulated data or the transmission opportunity, the portion included in one of the secondary resource blocks having outer and inner boundaries, wherein the inner boundaries are boundaries between secondary resource blocks;
    determining, from a first information profile describing characteristics of the data frame at a super-frame level, a location of one of the sub-frames that includes the one secondary resource block, the one sub-frame including a second information profile;
    after determining the location of the one sub-frame, determining from the second information profile, which is in a hierarchical relationship with the first information profile, a location of the one secondary resource block, wherein the location of the one secondary resource block is determined based on the inner boundaries;
    retrieving a portion of the encapsulated data or the transmission opportunity; and
    processing the retrieved data or the transmission opportunity.

2. The method of claim 1, wherein the primary resource blocks are included in corresponding sub-frames.

3. The method of claim 1, further comprising:
    including a Super-MAP in a first sub-frame of a super-frame; and
    storing the first information profile in the Super-MAP, the first information profile including description information corresponding to the super-frame.

4. The method of claim 3, wherein the first information profile comprises:
    a physical synchronization field used to synchronize communication between nodes in the communication system;
    a sub-frame profile identifying a number of the sub-frames and a length of each of the sub-frames, wherein the lengths are defined by using orthogonal frequency-division multiplexing access symbols;
    a base station ID providing identification information corresponding to a node in the communication system from which the data frame was received; and
    a sub-frame usage code indicating at least one of functions, service types and modulation or coding schemes supported by the sub-frames.

5. The method of claim 4, wherein the sub-frame profile and the sub-frame usage code are replaced with a sub-frame usage code profile including pre-defined values indicating configurations of the sub-frames.

6. The method of claim 1, further comprising:
    including at least one Sub-MAP among downlink sub-frames in a super-frame including the sub-frames; and
    storing the second information profile in the at least one Sub-MAP.

7. The method of claim 6, wherein the second information profile describes the inner boundaries by including information corresponding to:
    a quantity of the inner boundaries;
    starting points of the inner boundaries;
    directions of the inner boundaries; and
    lengths of the inner boundaries, the length being defined by using orthogonal frequency-division multiplexing access symbols or sub-channels.

8. The method of claim 1, wherein the sub-frames are at least one of a downlink sub-frame and an uplink sub-frame.

9. The method of claim 8, wherein a Sub-MAP is included in the downlink sub-frame, the Sub-MAP describing data encapsulated in the corresponding downlink sub-frames and the transmission opportunity included in the corresponding uplink sub-frames.

10. The method of claim 1, wherein the location of the one secondary resource block is determined without retrieving information corresponding to the outer boundaries.

11. An apparatus for performing resource allocation in a communication system, comprising:
    a receiver to receive a data frame including encapsulated data and a transmission opportunity, the data frame being divided into sub-frames which include primary resource blocks that are divided into secondary resource blocks storing the encapsulated data or the transmission opportunity; and
    a processor to:
        deconstruct the data frame to retrieve a portion of the encapsulated data or the transmission opportunity, the portion included in one of the secondary resource blocks having outer and inner boundaries, wherein the inner boundaries are boundaries between secondary resource blocks;
        determine from a first information profile describing characteristics of the data frame at a super-frame level, a location of one of the sub-frames that includes the one secondary resource block, the one sub-frame including a second information profile;
        after determining the location of the one sub-frame, determine from the second information profile, which is in a hierarchical relationship with the first information profile, a location of the one secondary resource block, wherein the location of the one secondary resource block is determined based on the inner boundaries;
        retrieve the portion of the encapsulated data or the transmission opportunity; and
        process the retrieved data or the transmission opportunity.

12. The apparatus of claim 11, wherein the primary resource blocks are included in corresponding sub-frames.

13. The apparatus of claim 11, wherein:
    a Super-MAP is included in a first sub-frame of the sub-frames;
    the first information profile is stored in the Super-MAP, the first information profile including description information corresponding to the super-frame; and
    the transmission opportunity is included in the uplink sub-frame included in the sub-frames.

14. The apparatus of claim 13, wherein the first information profile comprises:
    a physical synchronization field used to synchronize communication between the apparatus and a node in the communication system;
    a sub-frame profile identifying a number of the sub-frames and a length of each of the sub-frames, wherein the lengths are defined by using orthogonal frequency-division multiplexing access symbols;
a base station ID providing identification information corresponding to a node in the communication system from which the data frame was received; and
a sub-frame usage code indicating at least one of functions, service types and modulation or coding schemes supported by the sub-frames.

15. The apparatus of claim 14, wherein the sub-frame profile and the sub-frame usage code are replaced with a sub-frame usage code profile including pre-defined values indicating configurations of the sub-frames.

16. The apparatus of claim 11, wherein:
a Sub-MAP is included in a downlink sub-frame included in the sub-frames; and
the second information profile is stored in the Sub-MAP.

17. The apparatus of claim 16, wherein the second information profile describes the inner boundaries by including information corresponding to:
a quantity of the inner boundaries;
starting points of the inner boundaries;
directions of the inner boundaries; and
lengths of the inner boundaries, the length being defined by using orthogonal frequency-division multiplexing access symbols or sub-channels.

18. The apparatus of claim 11, wherein the location of the one secondary resource block is determined without retrieving information corresponding to the outer boundaries.

19. An apparatus for transmitting data in a communication system, comprising:
a memory device to store data;
a processor to:
retrieve the stored data;
encapsulate the data and a transmission opportunity to generate a data frame, the data frame being divided into sub-frames and including:
primary resource blocks that are divided into secondary resource blocks storing the encapsulated data or the transmission opportunity;
a first information profile describing characteristics of the data frame at a super-frame level, the characteristics including location information corresponding to a portion of the encapsulated data or the transmission opportunity stored in one of the secondary resource blocks having outer and inner boundaries, the location information identifying one of the sub-frames including the one secondary resource block, the one sub-frame including a second information profile, wherein the inner boundaries are boundaries between secondary resource blocks; and
the second information profile, which is in a hierarchical relationship with the first information profile, including inner boundary information corresponding to the one secondary resource block, wherein the location of the one secondary resource block is determined after identifying the one sub-frame and is determined based on the inner boundary information of the second information profile; and
a transmitter to transmit the data frame to a node in the communication system, the data frame being processed to retrieve the portion of the encapsulated data or the transmission opportunity.

20. The apparatus of claim 19, wherein the processor includes the primary resource blocks in corresponding sub-frames.

21. The apparatus of claim 19, wherein the processor:
includes a Super-MAP in a first sub-frame of the sub-frames;
stores the first information profile in the Super-MAP, the first information profile including description information corresponding to the super-frame; and
includes the transmission opportunity in an uplink sub-frame included in the sub-frames.

22. The apparatus of claim 21, wherein the first information profile comprises:
a physical synchronization field used to synchronize communication between the apparatus and a node in the communication system;
a sub-frame profile identifying a number of the sub-frames and a length of each of the sub-frames, wherein the lengths are defined by using orthogonal frequency-division multiplexing access symbols;
a base station ID providing identification information corresponding to a node in the communication system from which the data frame was received; and
a sub-frame usage code indicating at least one of functions, service types and modulation or coding schemes supported by the sub-frames.

23. The apparatus of claim 22, wherein the sub-frame profile and the sub-frame usage code are replaced with a sub-frame usage code profile including pre-defined values indicating configurations of the sub-frames.

24. The apparatus of claim 19, wherein the processor:
includes at least one Sub-MAP among downlink sub-frames included in a super-frame including the sub-frames; and
stores the second information profile in the Sub-MAP.

25. The apparatus of claim 24, wherein the second information profile describes the inner boundaries by including information corresponding to:
a quantity of the inner boundaries;
starting points of the inner boundaries;
directions of the inner boundaries; and
lengths of the inner boundaries, the length being defined by using orthogonal frequency-division multiplexing access symbols or sub-channels.

* * * * *